(12) United States Patent
Bai et al.

(10) Patent No.: US 12,008,792 B1
(45) Date of Patent: Jun. 11, 2024

(54) INDEPENDENTLY DETERMINING ADJUSTMENTS TO BOUNDING SHAPES FOR DETECTED OBJECTS IN IMAGE DATA

(71) Applicant: Amazon Technologies, Inc., Seattle, WA (US)

(72) Inventors: Min Bai, New York, NY (US); Jonathan Buck, Mountain View, CA (US); Patrick Guy Haffner, Atlantic Highlands, NJ (US); Kumar Hemachandra Chellapilla, Mountain View, CA (US); Li Erran Li, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 361 days.

(21) Appl. No.: 17/548,380

(22) Filed: Dec. 10, 2021

(51) Int. Cl.
| | |
|---|---|
| *G06N 3/08* | (2023.01) |
| *G06F 3/0484* | (2022.01) |
| *G06T 7/13* | (2017.01) |
| *G06V 10/22* | (2022.01) |
| *G06V 10/25* | (2022.01) |

(52) U.S. Cl.
CPC .......... *G06V 10/235* (2022.01); *G06F 3/0484* (2013.01); *G06N 3/08* (2013.01); *G06T 7/13* (2017.01); *G06V 10/25* (2022.01)

(58) Field of Classification Search
CPC .... G06V 10/235; G06V 10/25; G06F 3/0484; G06N 3/08; G06T 7/13

USPC ........................................................ 382/173
See application file for complete search history.

(56) References Cited

U.S. PATENT DOCUMENTS

| | | | |
|---|---|---|---|
| 11,176,415 B2 | 11/2021 | Irshad et al. | |
| 2016/0125613 A1* | 5/2016 | Shustorovich | G06V 10/242 |
| | | | 382/140 |
| 2019/0057507 A1* | 2/2019 | El-Khamy | G06T 5/20 |
| 2019/0366153 A1* | 12/2019 | Zhang | G06V 10/82 |
| 2020/0394453 A1 | 12/2020 | Ma et al. | |
| 2022/0044146 A1* | 2/2022 | Gardner | G06V 10/22 |

OTHER PUBLICATIONS

Hei Law, et al., "CornerNet: Detecting Objects as Paired Keypoints", arXiv:1808.01244v2, Mar. 18, 2019, pp. 1-14.

* cited by examiner

*Primary Examiner* — Charlotte M Baker
(74) *Attorney, Agent, or Firm* — S. Scott Foster; Kowert, Hood, Munyon, Rankin & Goetzel, P.C.

(57) ABSTRACT

Adjustments to bounding shapes for detected objects in image data may be independently determined. A bounding shape for an object detected in image data may be obtained. Independently determined adjustments for one or more edges of the bounding shape may be determined according to a multi-scale feature map generated from different resolutions of the image data that is provided as input to different dimension decoders to determine the adjustments to the bounding shape and respective confidence scores for the adjustments. The confidence scores are evaluated with respect to a confidence threshold to determine whether to provide the adjustments to the one or more edges of the bounding shape.

20 Claims, 10 Drawing Sheets

INDEPENDENTLY DETERMINING ADJUSTMENTS TO BOUNDING SHAPES FOR DETECTED OBJECTS IN IMAGE DATA

BACKGROUND

Computer vision or other object recognition techniques offers computers many capabilities to performance various tasks that might otherwise be impossible for the computer to perform in different scenarios. Object recognition has, for instance, many different applications to facilitate diverse technologies and systems, including automated vehicle operation, assisted medical operations, or identity services to provide secure payment or other transactions. In order to facilitate computer vision tasks, various different training data sets labeled width different objects may be used to train different computer vision models, which may be implemented to perform computer vision tasks in different scenarios.

Figure 1:
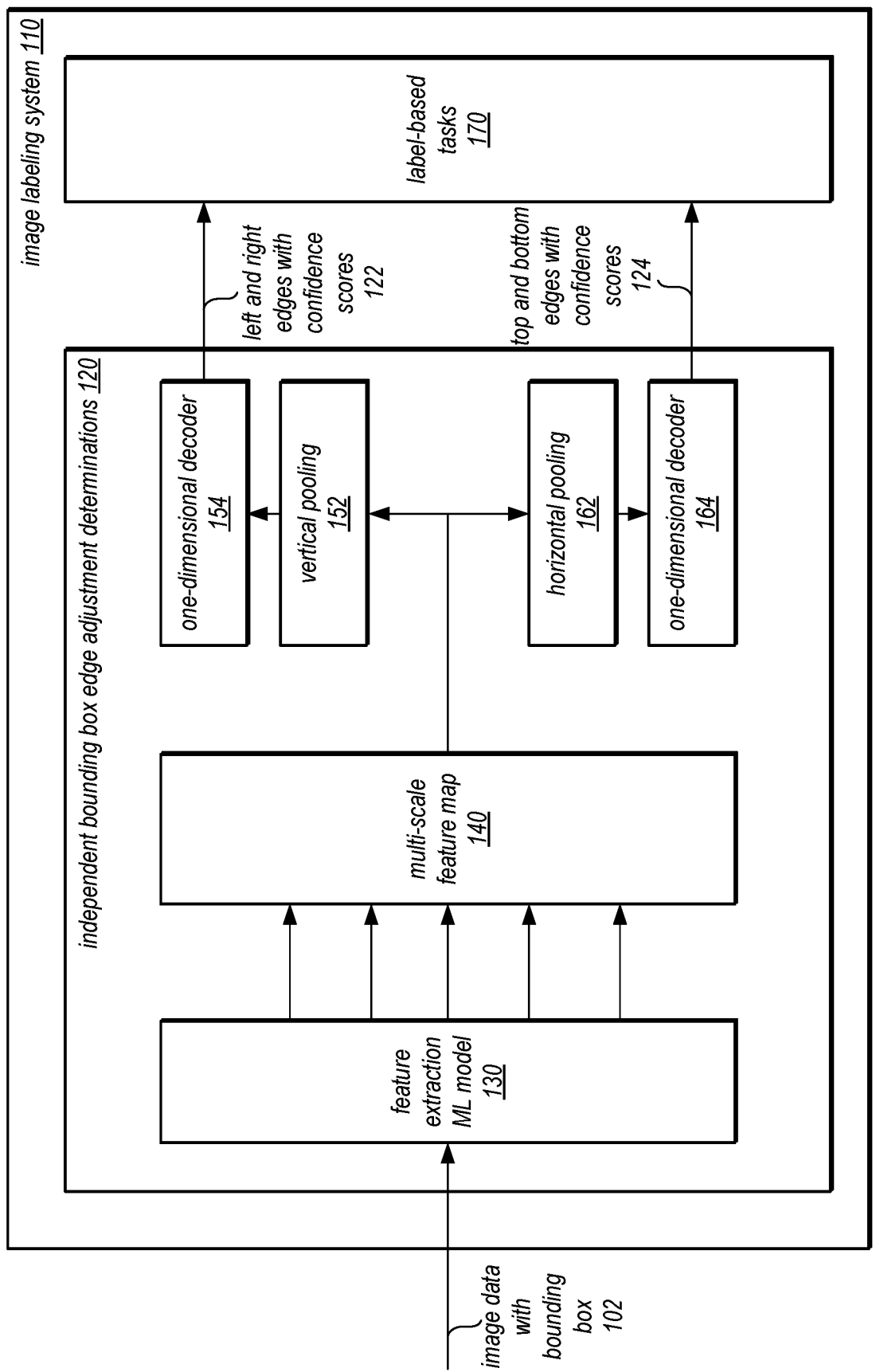
FIG. 1 illustrates a logical diagram of independently determining adjustments to bounding shapes for detected objects in image data, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for independently determining adjustments to bounding shapes for detected objects in image data are described herein. Bounding shapes, such as bounding boxes, may identify a portion of image data that contains an object. Various computer vision tasks performed using machine learning models, such as object detection, image classification, and image regression, among others, may be trained using image data labeled with bounding shapes. Therefore, accurate bounding shapes are important information when labelling image data. Improperly defined bounding shapes may be harmful when used to train a computer vision model. High quality labeled image data may be costly to produce. Moreover, it may be difficult to measure the quality of labeled image data.

Techniques for independently determining adjustments to bounding shapes for detected objects in image data may increase accuracy (and thus confidence in) and lowering cost at every step of the labelling process. For example, these techniques may confidence scores determined bounding shapes. In this way, the bounding shapes produced from these determined adjustments can be reliable and used at many steps in the labeling process, such as an initial suggestion for human annotators, as a method to verify the quality of human annotation, or as a label to train another model. Other use cases may include automatic validation of noisy human labels, by taking as input a noisy bounding box and refines the edge locations/positions, which naturally can be applied to human annotated boxes which may have errors. By comparing the output of the model to the initial input, erroneous annotations can be identified (e.g., with fine-grained information as to the exact edges that may be misaligned). This is may be accompanied with a set of interpretable confidence estimates.

Another use case for these techniques may be to perform interactive labeling (techniques that speed up human labelling tasks). Consider scenarios where existing human annotation schemes require an annotator to zoom into an object to place precise bounding box edges (thus being labor intensive). Instead, independently determining adjustments to bounding shapes for detected objects in image data may allow human annotators to quickly place bounding boxes with loose tolerance and the determined adjustments may be used to automatically adjust the bounding to higher precision. Other interactive annotation process may be implemented that only prefills high-quality bounding boxes, and should discourage human annotators from costly systematic corrections.

Other approaches to determining bounding shapes may use regression that attempt to locate the edges of an object as some distance from the center of the object by looking at the entire object. These other approaches may have challenges such as counterintuitive formulation—where accurate prediction of a bounding shape edge relies on first finding an accurate center, and then trying to establish scalar distances to edges. Nor do such approaches provide a confidence estimate that focuses on the uncertainties of the edge locations, as only the classifier score is available for use. Instead, in various embodiments, techniques for independently determining adjustments to bounding shapes for detected objects in image data may formulate location prediction for bounding shapes as a classification problem over different locations. While seeing the whole object, the techniques move the edge pixel by pixel until it snaps to the optimal location. This offers several advantages over other approaches, providing better accuracy as pixel-wise locations for the locations of edges (e.g., four edges of a bounding box) may be determined by reasoning about the presence or absence of an edge directly at each pixel's location, and intuitive confidence/uncertainty estimates for each edge of the object independently and provides an interpretable distribution (or uncertainty estimate) for each edge's location. These techniques can provide a distribution of output that can be multi-modal, which has applications such as automatically proposing the most likely edges for human annotators to accept/reject, thus speeding up annotation time. Furthermore, these techniques may be flexible, and may be implemented using varying machine learning model architectures (e.g., ResNet-50, VGG, Transformer, etc.). Additionally, these techniques may be extensible to representing the probability of the presence of an edge (e.g., rotated boxes or polygons of more than four sides).

Figure 2:
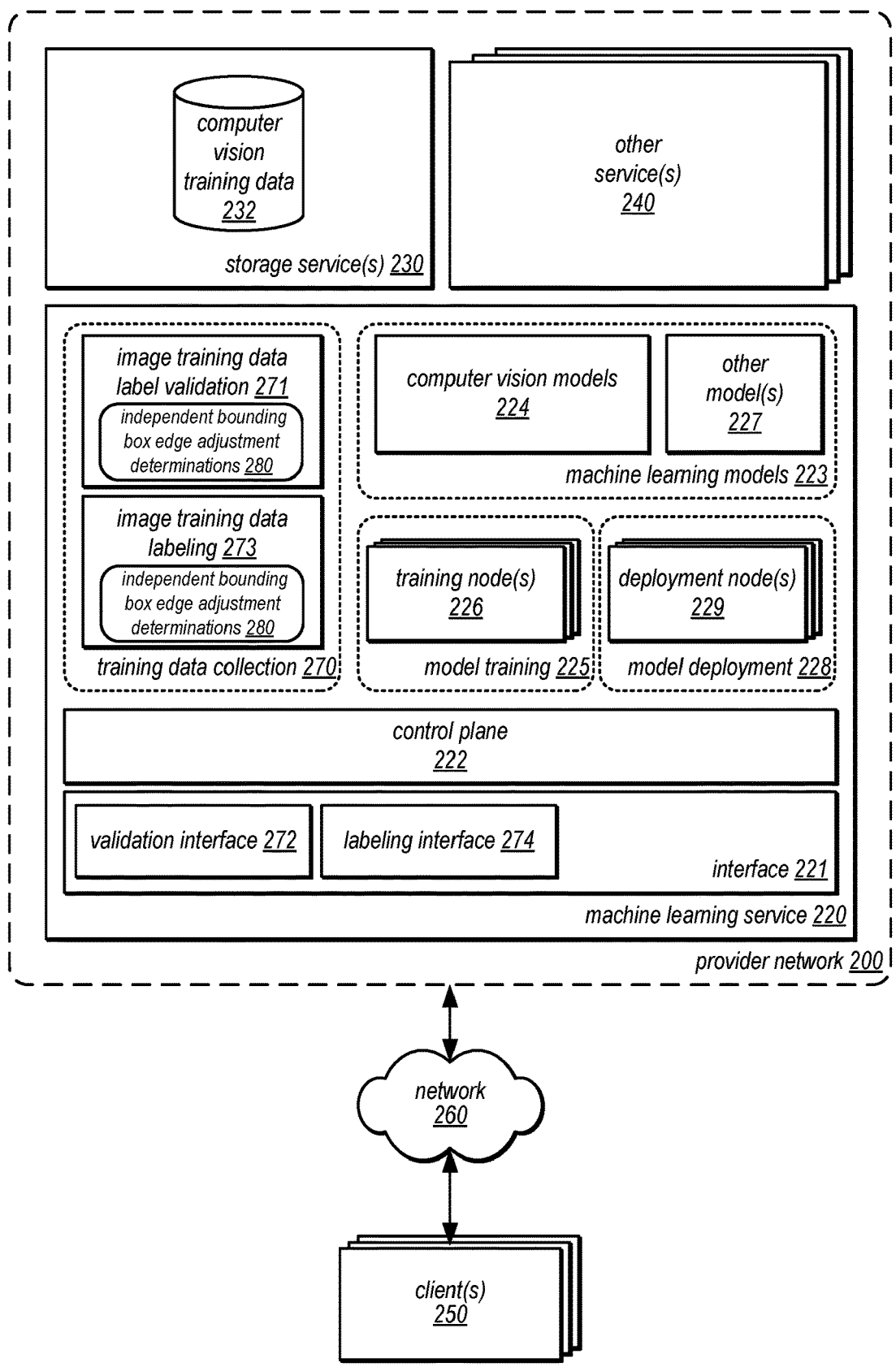
FIG. 2 illustrates an example provider network that may implement a machine learning service that implements independently determining adjustments to bounding shapes for detected objects in image data, according to some embodiments.

FIG. 1 illustrates a logical diagram of independently determining adjustments to bounding shapes for detected objects in image data, according to some embodiments. Image labeling system 100 may be implemented as part of various training systems, data collection systems, or real-time computer vision tasks (e.g., that detect bounding shapes for various operations). As illustrated in FIG. 2 below, various image labeling features may be implemented as part of a machine learning service.

Image labeling system 110 may implement independently determining adjustments to one or more edges of bounding shapes for detected objects in image data. For example, independent bounding box edge adjustment determinations may be made for image data received at 102 with a bonding box. For a first input bounding box, one edge may be adjusted, whereas for another input bounding box, three edges may be adjusted. Therefore, the techniques described in detail below are applicable to predict and adjust edges of a bounding shape like a bounding box individual.

A feature extraction machine learning model 130 (e.g. a convolutional neural network (CNN) model) may be trained to extract features at different resolutions of image data (as indicated by the multiple arrows). As discussed below with regard to FIG. 6, in some embodiments, the image data may be cropped to a portion that includes an input bounding box. These extracted features at different resolutions may be combined into a multi-scale feature map 140, which may be used to determine edge specific predictions, using vertical pooling 152 and one dimensional decoder 154 to provide left and right edges with confidence scores 122 and horizontal pooling 162 and one-dimensional decoder 164 to provide top and bottom edges with confidence scores 124. Label-based tasks 170, such as validation or interactive labeling, as discussed in detail below with regard to FIGS. 3-9, may then perform various actions based on the predicted edges and the individual confidences scores determined for the predicted edges.

Please note that the previous description of image labeling system is a logical illustration and thus is not to be construed as limiting as to the implementation of an image labeling system.

This specification continues with a general description of a provider network that implements multiple different services, including a machine learning service, which may implement independently determining adjustments to bounding shapes for detected objects in image data. Then various examples of, including different components/modules, or arrangements of components/module that may be employed as part of implementing the services are discussed. A number of different methods and techniques to implement independently determining adjustments to bounding shapes for detected objects in image data are then discussed, some of which are illustrated in accompanying flowcharts. Finally, a description of an example computing system upon which the various components, modules, systems, devices, and/or nodes may be implemented is provided. Various examples are provided throughout the specification.

FIG. 2 illustrates an example provider network that may implement a machine learning service that implements independently determining adjustments to bounding shapes for detected objects in image data, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment.

Provider network 200 may be implemented in a single location or may include numerous data centers hosting various resource pools, such as collections of physical and/or virtualized computer servers, storage devices, networking equipment and the like (e.g., computing system 2000 described below with regard to FIG. 12), needed to implement and distribute the infrastructure and storage services offered by the provider network 200. The provider network 200 can be formed as a number of regions (e.g., regions 201), where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network 200 via a publicly accessible network (e.g., the Internet, a cellular communication network).

Regions are connected to a global network which includes private networking infrastructure (e.g., fiber connections controlled by the cloud provider) connecting each region to at least one other region. The provider network 200 may deliver content from points of presence outside of, but networked with, these regions by way of edge locations and regional edge cache servers. An edge location can be an extension of the cloud provider network outside of the traditional region/AZ context. For example an edge location can be a data center positioned to provide capacity to a set of customers within a certain latency requirement, a set of servers provided to a customer's premises, or a set of servers provided within (or forming part of) a cellular communications network, each of which can be controlled at least in part by the control plane of a nearby AZ or region. This compartmentalization and geographic distribution of computing hardware enables the provider network 200 to provide low-latency resource access to customers on a global scale with a high degree of fault tolerance and stability.

The traffic and operations of the provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In some embodiments, provider network 200 may implement various computing resources or services, such as learning service 220, storage service(s) 230, and/or any other type of network-based services 240 (which may include a virtual compute service and various other types of storage, database or data processing, analysis, communication, event handling, visualization, data cataloging, data ingestion (e.g., ETL), and security services), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below, in one embodiment. In various embodiments, the functionality of a given system or service component (e.g., a component of object recognition service 210 or machine learning service 220 may be implemented by a particular node or may be distributed across several nodes. In some embodiments, a given node may implement the functionality of more than one service system component (e.g., more than one data store component).

Machine learning service 220 may implement various features, components, or systems to allow users to create, train, develop, analyze, and deploy machine learning model based applications. Machine learning refers to a discipline by which computer systems can be trained to recognize patterns through repeated exposure to training data. In unsupervised learning, a self-organizing algorithm learns previously unknown patterns in a data set without any provided labels. In supervised learning, this training data includes an input that is labeled (either automatically, or by a human annotator) with a "ground truth" of the output that corresponds to the input. A portion of the training data set is typically held out of the training process for purposes of evaluating/validating performance of the trained model. The use of a trained model in production is often referred to as "inference," during which the model receives new data that was not in its training data set and provides an output based on its learned parameters. The training and validation process may be repeated periodically or intermittently, by using new training data to refine previously learned parameters of a production model and deploy a new production model for inference, in order to mitigate degradation of model accuracy over time.

Machine learning service 220 may implement interface 221 to allow clients (e.g., client(s) 250 or clients implemented internally within provider network 200, such as a client application hosted on another provider network service like an event driven code execution service or virtual compute service) to train and deploy various machine learning models 223, including computer vision models 224 which may perform various tasks like object detection and image classification having been trained using training data collected by training data collection 270, and other model(s) 227, on training and input image data, such as image data (which may be found in various types of media, such as still images or video data) or other data (e.g., text/character strings for natural language processing). For example, machine learning service 220 may implement interface 221 (e.g., a graphical user interface, programmatic interface that implements Application Program Interfaces (APIs) and/or a command line interface) may be implemented so that a client can request training of a model 223 or deployment of a model 223. Training data may be like computer vision image data 232, and/or image data in other storage locations within provider network 200 or external to provider network 200 (e.g., on premise data storage in private networks).

Interface 221 may implement various types of interfaces for invoking various systems within machine learning service 220. For example, a training or deployment interface (not illustrated) may be used to invoke model training 225 to train machine learning models or to invoke model deployment 228 to deploy machine learning models. Similarly, interfaces such as validation interface 272 and labeling interface 274 may be implemented to interact with training data collection 270 systems image training data label validation 271 and image training data labeling 273.

As discussed in detail below with regard to FIGS. 3-9, and above with regard to FIG. 1, labeling tasks to create or curate training data sets for various computer vision tasks may include identifying or validating the bounding shapes (e.g., bounding boxes) for various computer vision training data 232. Machine learning service 220 may therefore implement training data collection 270 to provide various features that aid in the collection of image training data, such as image training data label validation 271, discussed in detail below with regard to FIG. 3, and image training data labeling 273, which may implement various techniques to interactively collect labels, including bounding boxes for objects in image data, such as discussed below with regard to FIGS. 4A, 4B, and 8. Such features may take advantage of the independent bounding box edge adjustment determinations 280 discussed above with regard to FIG. 1 and below with regard to FIGS. 3-9.

Machine learning service 220 may implement a control plane 222 to perform various control operations to implement the features of machine learning service 220. For example, control plane may monitor the health and performance of requests at different components, training node(s) 226 performing model training 225, deployment node(s) 229 performing model deployment 228, and nodes or other resources supporting image training data label validation 271 and image training data labeling 273. If a node fails, a request fails, or other interruption occurs, control plane 222 may be able to restart a job to complete a request (e.g., instead of sending a failure response to the client). Control plane 222 may, in some embodiments, may arbitrate, balance, select, or dispatch requests to different node(s) (e.g., to different deployment nodes 229), in various embodiments. For example, control plane 222 may receive requests via interface 221 which may be a programmatic interface, and identify an available node to begin work on the request.

Machine learning service 220 may implement model training 225. Training nodes(s) 226 may perform various stages, operations, or tasks of analyzing training data to apply an algorithm to train various portions of machine learning models, including computer vision models 224 using computer vision training data 232 that is labeled or validated as part of training data collection 270, and/or other model(s) 227, in some embodiments.

Machine learning service 220 may implement model deployment 229. Deployment nodes(s) 229 may perform various stages, operations, or tasks of applying a deployed model (e.g., computer vision model 224) to perform various tasks, in some embodiments.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may also include various kinds relational or non-relational databases, in some embodiments, Data storage service(s) 230 may include object or file data stores for putting, updating, and getting data objects or files, in some embodiments. For example, one data storage service 230 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. In at least some embodiments, data storage service(s) 230 may be treated as a data lake. For example, an organization may generate many different kinds of data, stored in one or multiple collections of data objects in a data storage service 230. The data objects in the collection may include related or homogenous data objects, such as database partitions of sales data, as well as unrelated or heterogeneous data objects, such as image data files (e.g., digital photos or video files) audio files and web site log files. Data storage service(s) 230 may be accessed via programmatic interfaces (e.g., APIs) or graphical user interfaces.

Generally speaking, clients 250 may encompass any type of client that can submit network-based requests to provider network 200 via network 260, including requests for machine learning service 220 (e.g., a request to label image data, etc.). For example, a given client 250 may include a suitable version of a web browser, or may include a plug-in module or other type of code module that can execute as an extension to or within an execution environment provided by a web browser. Alternatively, a client 250 may encompass an application such as a database application (or user interface thereof), a media application, an office application or any other application that may make use of machine learning service 220 to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. Clients 250 may convey network-based services requests (e.g., requests to interact with services like machine learning service 220) via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
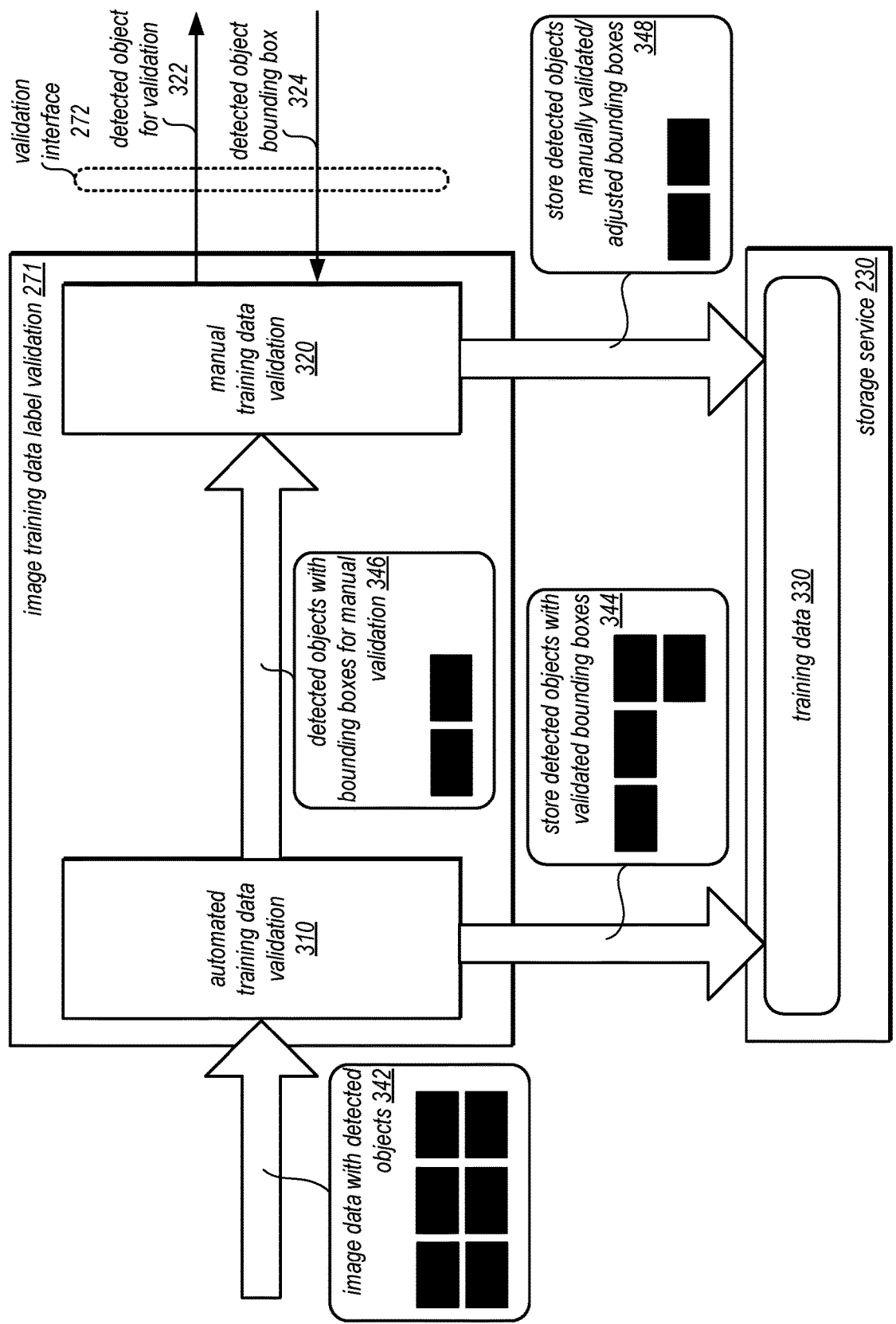
FIG. 3 illustrates a logical block diagram image training data label validation, according to some embodiments.

FIG. 3 illustrates a logical block diagram image training data label validation, according to some embodiments. Image training data label validation 271 may implement independent bounding box edge adjustment determinations 280 in order to provide for automated training data validation 310, as well as to efficiently identify when to provide detected objects for manual training data validation 320. For example, as illustrated in FIG. 3, a set of image data with detected objects 342 may be considered by automated training data validation 310.

Independent edge adjustment determinations may be made according to the techniques discussed above with regard to FIG. 1 and below with regard to FIGS. 5-8. Automated training data validation 310 may use the adjustments and their corresponding confidence scores to perform automated validation. For example, as discussed below with regard to FIG. 7, confidence scores may be evaluated with respect to a confidence threshold. If not satisfied (e.g., not exceeded), the adjusted version of the bounding box may not be useful for validation and instead the detected object may be included with detected objects with bounding boxes for manual validation 346. For adjusted versions of bounding boxes with a sufficient confidence, a determination may be made as to whether a threshold difference between a current bounding box and the adjusted version of the bounding box is exceeded. If so, then the detected object may be included with detected objects with bounding boxes for manual validation 346. For those detected objects with validated bounding boxes 344, automated training data validation 310 may store them in training data 330 in storage service 230.

Manual training data validation 320 may rely upon validation interface 272. Various prompts, displays, or other communications to provide a detected object for validation, as indicated at 322, may be performed. An affirmation of a bounding box or adjustment to a bounding box may be provided back, as indicated at 324. Once manually validated, the detected objects with manually validated bounding boxes 348 may be stored by manual training data validation 320, in some embodiments.

Figure 4A:
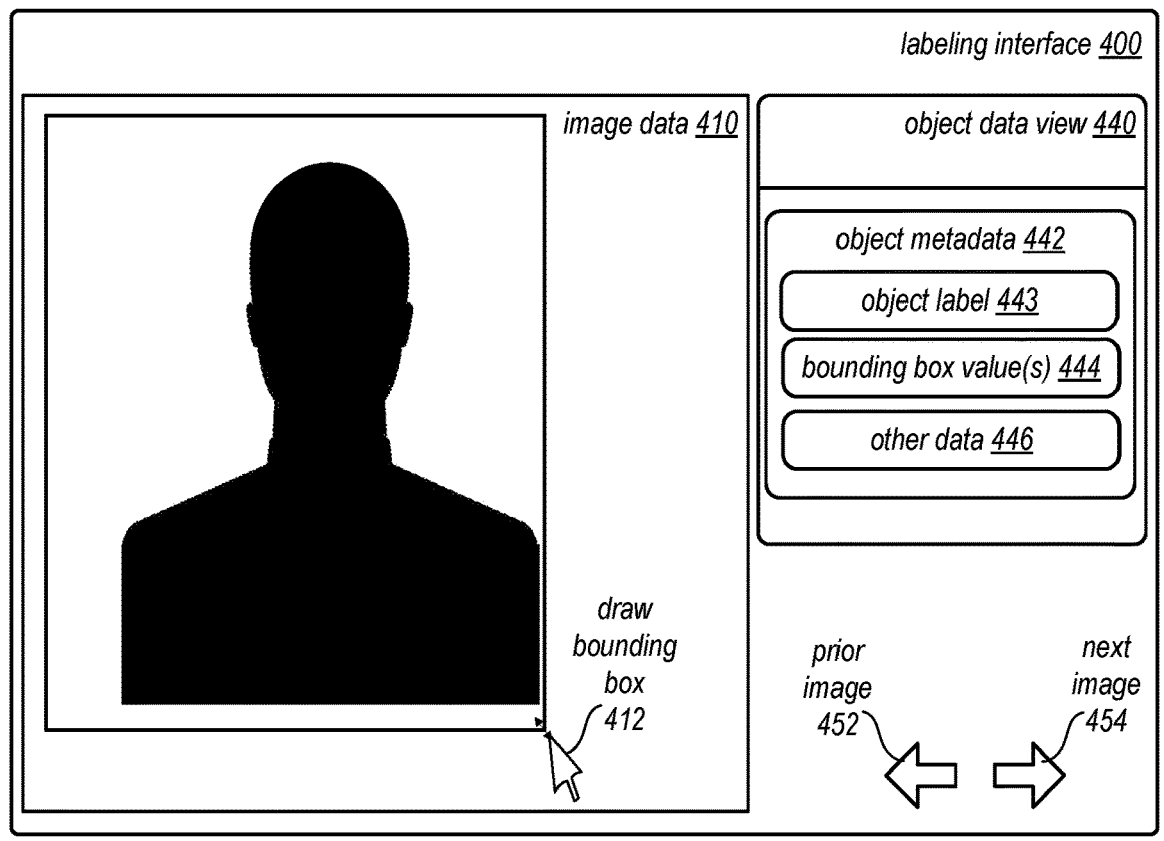
FIGS. 4A-4B illustrate a graphical user interface that implements automatically adjusting bounding boxes drawn in the graphical user interface, according to some embodiments.
Figure 4B:
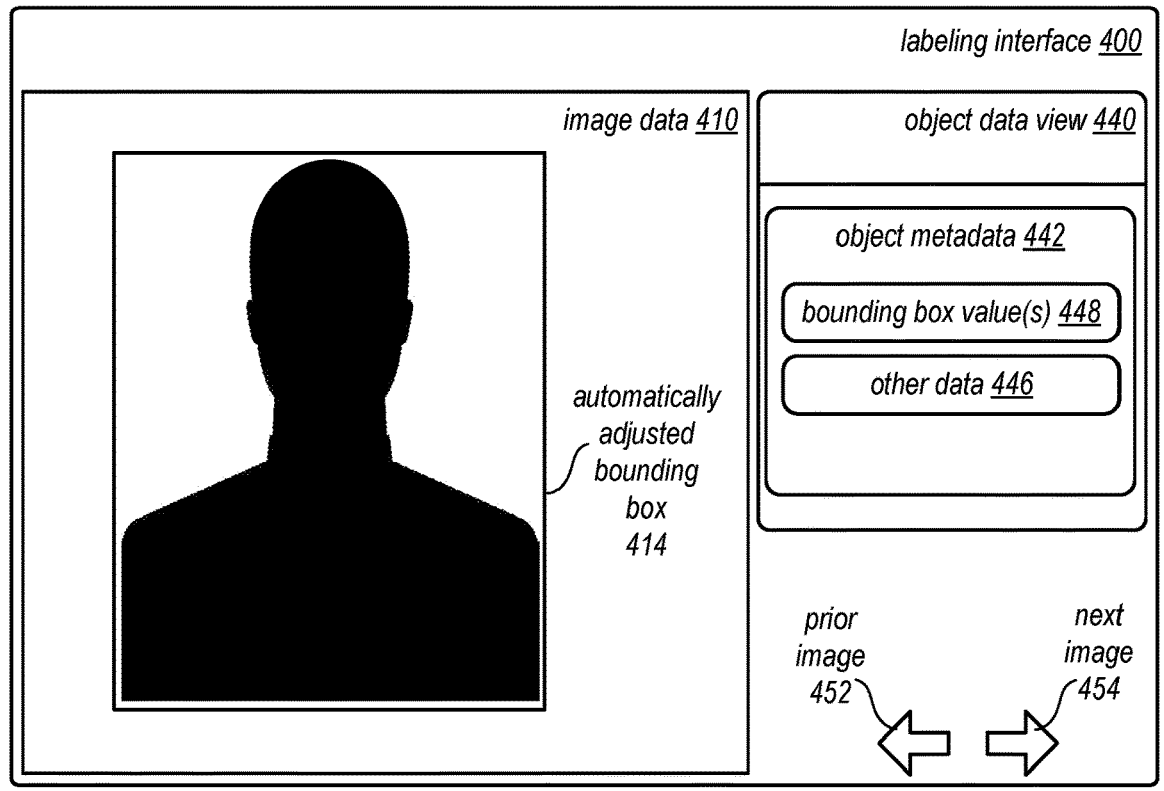

As discussed above with regard to FIG. 2, image training data labeling 273 may utilize independent bounding box edge adjustment determinations 280. A labeling interface 274 may provide for interactive user interface experiences, in order to take advantage of the quick labelling aspects that independent bounding box edge adjustment determinations 280 may provide. FIGS. 4A-4B illustrate a graphical user interface that implements automatically adjusting bounding boxes drawn in the graphical user interface, according to some embodiments.

Labeling interface 400 may be implemented as part of labeling interface 274, such as part of a workflow to perform manual labeling tasks on a set of images. Note that a similar interface could be provided for validation in order to validate the bounding boxes determined by other processes. As depicted in FIG. 4A, image data 410 may be displayed. Included within image data may be features that a user may wish to identify as an object, by using a draw or selection action to draw a bounding box, as indicated 412 around the object in image data 412. An object data view 440 may provide editable entries for the selected object, such as object metadata 442, which may include a label for the object 443, bounding box value(s) 444 (which may be manually entered as coordinates or specified via the draw operation 412), as well as various other metadata or information to include about the object. The displayed image data 410 may have been selected using prior image 452 or next image 454 navigation control elements (e.g., navigating a list of images to label).

Because independent bounding box edge adjustment determinations 280 may offer a highly performant edge adjustment technique, labeling interface 400 may rely upon them to increase user labeling efficiency. For example, as illustrated in FIG. 4B, the originally drawn bounding box may be automatically adjusted, as indicated at 414 (e.g., by providing a snap-to, auto-resize, or other automatic adjustment feature). One (or more) of the bounding box edges may be moved according to independently determined adjustments. Bounding box values 448 in the object data view may be correspondingly updated as well.

Although FIGS. 2-4B have been described and illustrated in the context of a provider network implementing a machine learning service that implements various labeling features for computer vision machine learning models, the various components illustrated and described in FIGS. 2-4 may be easily applied to other systems that train or collect data for training that includes images with detected object bounding boxes. As such, FIGS. 2-4B are not intended to be limiting as to other embodiments of independently determining adjustments to bounding shapes for detected objects in image data.

Figure 5:
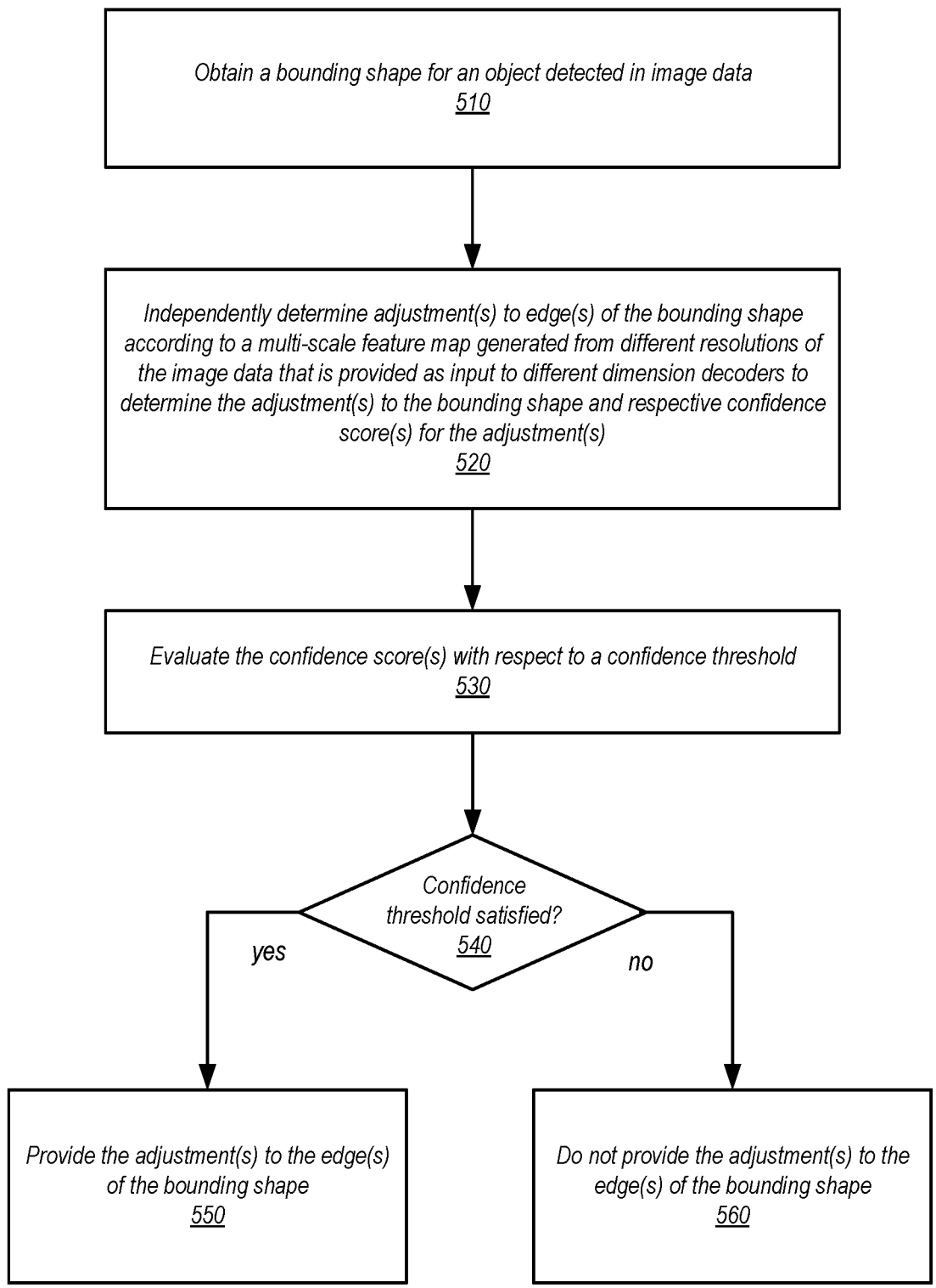
FIG. 5 illustrates a high-level flowchart of various methods and techniques to implement independently determining adjustments to bounding shapes for detected objects in image data, according to some embodiments.

FIG. 5 illustrates a high-level flowchart of various methods and techniques to implement independently determining adjustments to bounding shapes for detected objects in image data, according to some embodiments. Various different systems and devices may implement the various methods and techniques described below, either singly or working together. Therefore, the above examples and or any other systems or devices referenced as performing the illustrated method, are not intended to be limiting as to other different components, modules, systems, or devices.

As indicated at 510, a bounding shape may be obtained for an object detected in image data, in some embodiments. For example, user interfaces, such as graphical user interface discussed above with regard to FIGS. 4A-4B and below with regard to FIG. 8 may be implemented to allow a user to draw or otherwise specify the bounding shape. In some embodiments, the bounding shape may already specified for image data (e.g., as a result of an object detection machine learning model, or prior manual annotation). Different types of bounding shapes may be used. For example, bounding boxes may be one type of bounding shape (e.g., a polygon with four sides). Other polygon sizes (e.g., of three or five (or greater) sides) may also be used as bounding shapes. In some embodiments, bounding shapes like a bounding box may be rotated sot that the sides of the bounding box are not perpendicular or parallel to the x and y axes of image data (e.g., a bounding box at a 300 slant).

As indicated at 520, adjustment(s) to one or more edges of the bounding box according may be determined according to a multi-scale feature map generated from different resolutions of the image data that is provided as input to different dimension decoders to determine the adjustment(s) to the bounding box and confidence score(s) for the adjustment(s), in some embodiments. The difference between a current edge and a new predicted, corresponding edge may be the adjustment to the edge. As discussed above with regard to FIG. 1 and in detail below with regard to FIG. 6, different edges may be separately determined for the bounding shape of the detected object using different decoders. In this way, an edge determination for one side of the bounding shape may not influence the edge determination for another side of the bounding shape.

Moreover, because a predicted edge may be similar to (or the same as) a given input edge, only some of the predicted edges may be used to determine adjustments. For instance, 3 edges of a bounding box may be predicted that are similar to (e.g., within a difference threshold) or the same as the obtained bounding box, while 1 predicted edge may be different (e.g., above a difference threshold). Therefore, adjustments many not be determined for all edges of a shape, but less than all, in some scenarios.

In some embodiments, predicted edges may correspond to one of a set of predicted locations for an edge, which may be mapped to different probabilities that the edge is in that location. For example, edge 1 may have a location X with a 65% probability, a location Y with a 20% probability, and a location Z with a 15% probability. Thus, in some embodiments, the probability distribution of predictions for an individual edge may be used in analyzing various adjustment actions. Consider a scenario where the given location of an edge of a bounding shape does not match the predicted location with the highest confidence score. Instead, the given location of the edge matches another predicted location in the probabilistic distribution for the edge with a lower confidence score, then that may impact whether adjustment should be provided (e.g., as the matching location may have a higher probability of accuracy than the location with a higher confidence score).

As indicated at 530, the confidence score(s) of the adjustment(s) may be evaluated with respect to a confidence threshold. For example, a confidence score threshold of 75% may be enforced so that adjustments to edges below the confidence score threshold are not considered. In some embodiments, the confidence score may be a combination of individual confidence scores generated for the individual adjustment determinations (e.g., an average). In some embodiments, adjustments for edges may be considered on an individual basis, such that some adjustments may be provided that do satisfy the confidence threshold and other adjustments that do not for the same bounding shape are not provided.

If a confidence threshold is satisfied, as indicated by the positive exit from 540, then the determined adjustments to the one or more edges of the bounding shape may be provided, as indicated at 550. For example, the adjustments may be provided as a display of an adjusted version of the bounding box or the adjustments may be provided using coordinates, plots or other location identifiers. In some embodiments, providing the adjustments may involve various kinds of validation or interactive labeling interfaces, as discussed above. In some embodiments, providing the adjustments may include storing image data with the adjusted version of the bounding boxes for a detected image. If the confidence threshold is not satisfied, then, as indicated by the negative exit from 540, the adjustments to the one or more edges of the bounding shape may not be provided, as indicated at 560. For example, a manual workflow may be initiated using the current bounding box alone for validation (and not illustrating or displaying an adjusted version of the bounding box).

Figure 6:
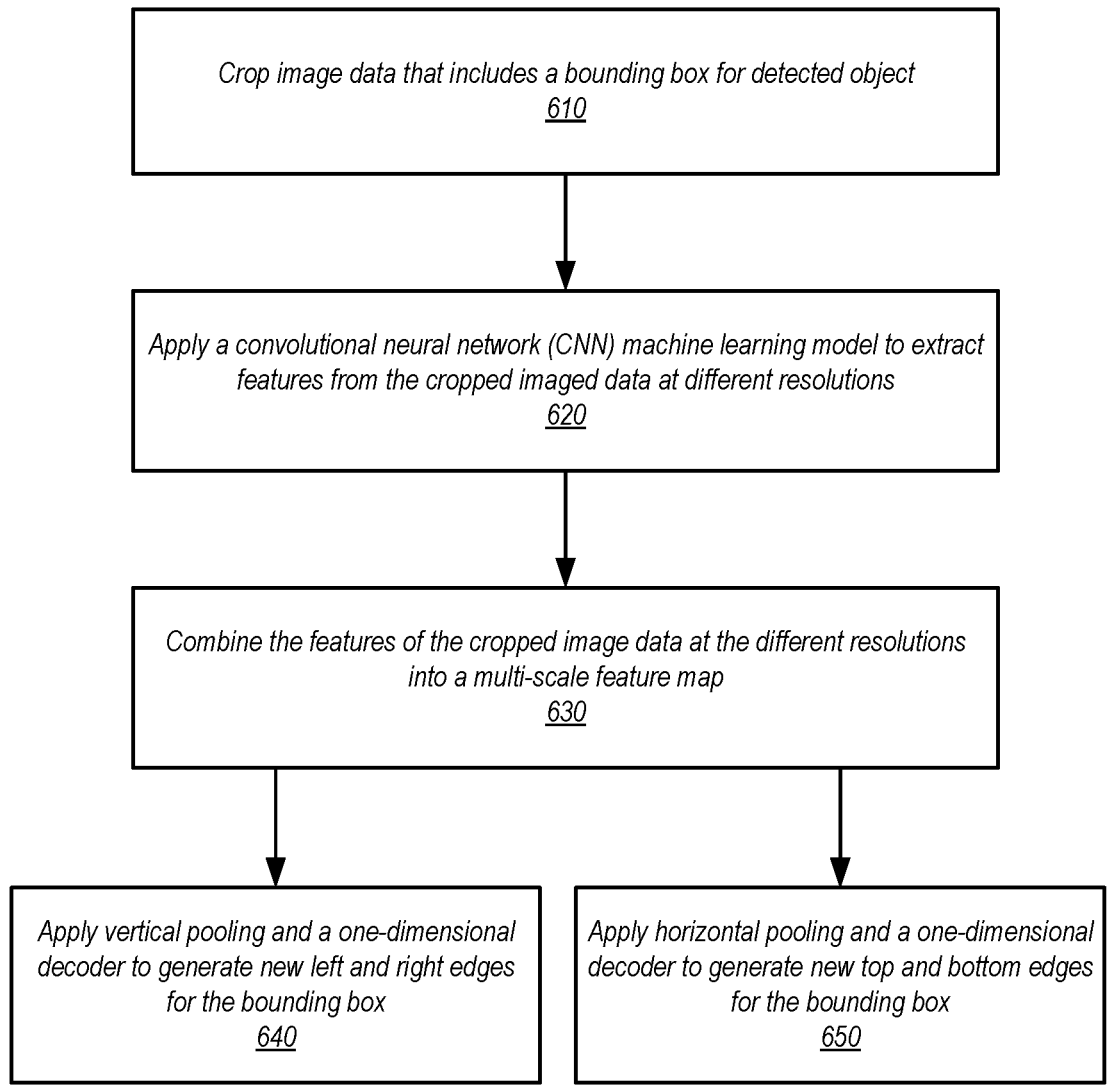
FIG. 6 illustrates a high-level flowchart of various methods and techniques to implement extracting features to combine into a multi-scale feature map for pooling to decode new bounding box edges, according to some embodiments.

FIG. 6 illustrates a high-level flowchart of various methods and techniques to implement extracting features to combine into a multi-scale feature map for pooling to decode new bounding box edges, according to some embodiments. As indicated at 610, image data that includes the bounding box for the detected object may be cropped, in some embodiments. For example, a surrounding portion of image data (e.g., a buffer amount or context amount) of image data may be included in addition to the bounding box (e.g., by extending outward from the bounding box edges a number of pixels in each direction).

As indicated 620, a convolutional neural network (CNN) machine learning model may be applied to extract features from the cropped image data at different resolutions, in some embodiments. For example various different types of CNN machine learning models may be used as the backbone model for the determination of bounding box adjustments, including, but not limited to ResNet-50, Visual Geometry Group (VGG), and Transformer. The CNN machine learning model may be trained, in some embodiments, using jittered (e.g., permuted) ground truth boxes (e.g., using ±10% translation, 90% size rescaling) and a cross entropy loss function to produce as an inference output bounding boxes. Different resolutions (e.g., by upsampling or downsampling pixel values) of the cropped image data may be provided as input to the CNN model.

As indicated at 630, the features of the cropped image data at the different resolutions may be combined into a multi-scale feature map. A feature map may describe an application of a filter of the CNN machine learning model to the input image. Thus a multi-scale feature map may be the combination of feature maps that correspond to the different resolutions.

As indicated at 640, vertical pooling may be implemented and then a one-dimensional encoder to the feature map to generate new left and right edges for the bounding box, in some embodiments. In some embodiments, respective confidence values for each edge may be provided. Similarly, as indicated at 650, horizontal pooling may be implemented and then a one-dimensional encoder to the feature map to generate new top and bottom edges for the bounding box, in some embodiments.

Figure 7:
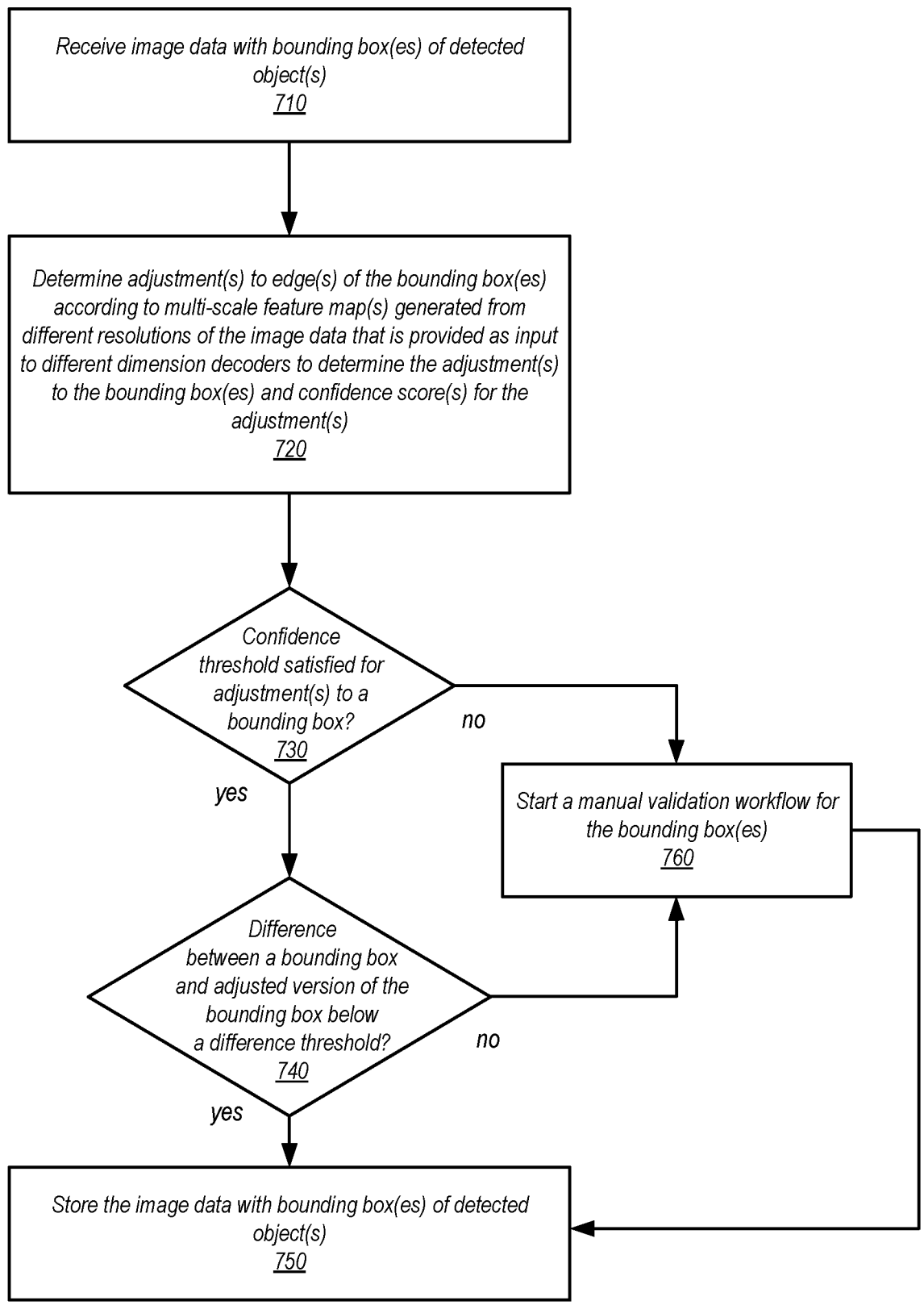
FIG. 7 illustrates a high-level flowchart of various methods and techniques to implement bounding box validation techniques, according to some embodiments.

As discussed above with regard to FIGS. 2 and 3, different validation techniques for labeled image data, including bounding shape labels, may be implemented using independently determined adjustments to different edges of a bounding shape. FIG. 7 illustrates a high-level flowchart of various methods and techniques to implement bounding box validation techniques, according to some embodiments. As indicated at 710, image data with bounding box(es) of detected objects may be received. For example, the image data may be a batch or large data set of multiple images with one (or more) labels including bounding boxes for detected objects corresponding to the labels. In some embodiments, the image data may be received as part of a request to perform validation on the image data (e.g., via a validation interface 272 as discussed above).

As indicated at 720, adjustment(s) to one or more edges of the bounding box according may be determined according to a multi-scale feature map generated from different resolutions of the image data that is provided as input to different dimension decoders to determine the adjustment(s) to the bounding box and confidence score(s) for the adjustment(s), in some embodiments. FIGS. 5 and 6, discussed above, may describe the various techniques for determining these adjustments.

As indicated at 730, a confidence score threshold may be evaluated for each of the bounding boxes and their determined adjustment(s). If the confidence threshold is satisfied, then further automated validation may continue on to element 740. If not, then as indicated at 760, a manual validation workflow for the bounding box(es) may be initiated. For instance, a manual validation workflow may store, queue, or otherwise set aside the bounding boxes for display via an graphical user interface, allowing a user to adjust a bounding box's position to better fit a detected object using various elements of the graphical user interface (e.g., the draw operation of FIG. 4A). When the manual validation is completed (e.g., either when an update to a bounding box is performed or an input received verifying the correctness of a bounding box (or a version of the bounding box updated according to the determined adjustments), then the bounding box(es) of the manual workflow may be stored as part of the image data with bounding box(es) of detected object(s), as indicated at 750 (e.g., for machine learning model training purposes).

Another analysis may be performed at 740, which may evaluate a difference between a bounding box and the adjusted version of the bounding box (having had the determined adjustment(s) applied to produce an updated version of the bounding box). For example, an intersection over union (IoU) or other difference measure may be determined, which may be compared with a difference threshold value. If, the different value is not below the difference threshold, then a manual validation workflow for the bounding box may be started, as indicated at 760. If so, then as indicated at 750, the bounding boxes that satisfy the analysis at both 730 and 740 may be automatically validated without manual (e.g., user) intervention, and stored with the image data of the bounding box(es) of detected objects (e.g., to provide training data for a machine learning model).

Figure 8:
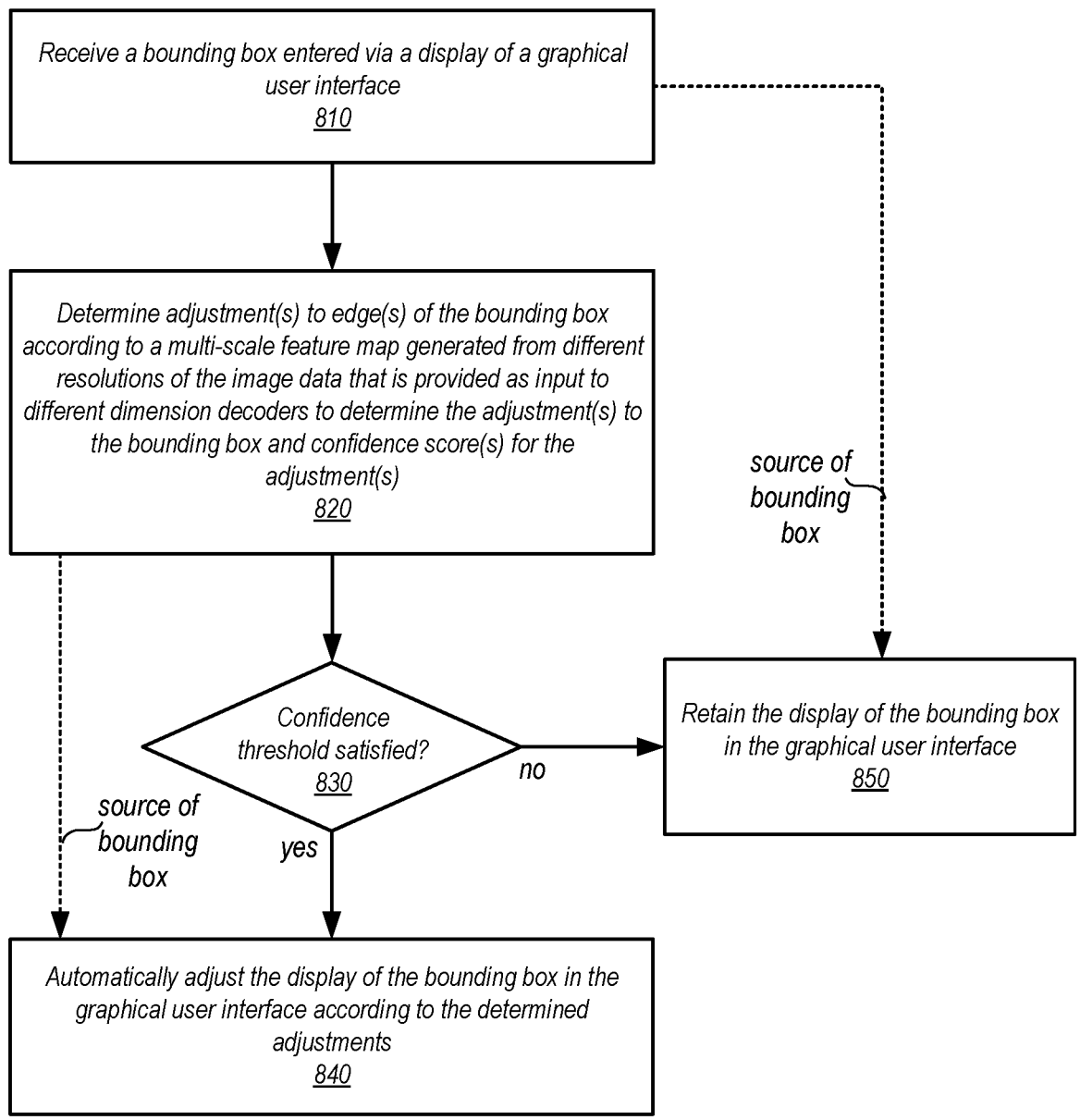
FIG. 8 illustrates a high-level flowchart of various methods and techniques to implement interactive bounding box adjustments according to confidence values, according to some embodiments.

As discussed above with regard to FIGS. 2 and 4A-4B, different interactive labeling techniques for an image data may be implemented using independently determined adjustments to different edges of a bounding shape. FIG. 8 illustrates a high-level flowchart of various methods and techniques to implement interactive bounding box adjustments, according to some embodiments. As indicated at 810, a bounding box may be received via a display of graphical user interface, in some embodiments. For example, as discussed above with regard to FIG. 4A, a draw or other selection operation may be performed in a display of image data in order to select or otherwise place the bounding box on a portion of the image data.

As indicated at 820, adjustment(s) to one or more edges of the bounding box according may be determined according to a multi-scale feature map generated from different resolutions of the image data that is provided as input to different dimension decoders to determine the adjustment(s) to the bounding box and respective confidence score(s) for the adjustment(s), in some embodiments. FIGS. 5 and 6, discussed above, may describe the various techniques for determining these adjustments.

As indicated at 830, the confidence score determined for the adjustment(s) may be compared with a confidence threshold. For example, the confidence threshold may be set in such a way as to determine when automated changes should be performed. As indicated at 840, the display of the bounding box in the graphical user interface may be automatically adjusted according to the determine adjustments, if the confidence threshold is satisfied. In this way, a user can provide a loose bounding box definition (e.g., oversized), which a labeling system, like labeling system 100 discussed above, can quickly (e.g., in real time) evaluate and automatically adjust to fit an object in the image data (e.g., by adjusting one, multiple or all edges to a different location). Such a feature may significantly reduce the time that it takes to annotate image data with bounding boxes without sacrificing bounding box accuracy. Although the techniques are discussed above in the context of utilizing a bounding box, similar techniques and advantage may be obtained for other bounding shapes in other embodiments.

Figure 9:
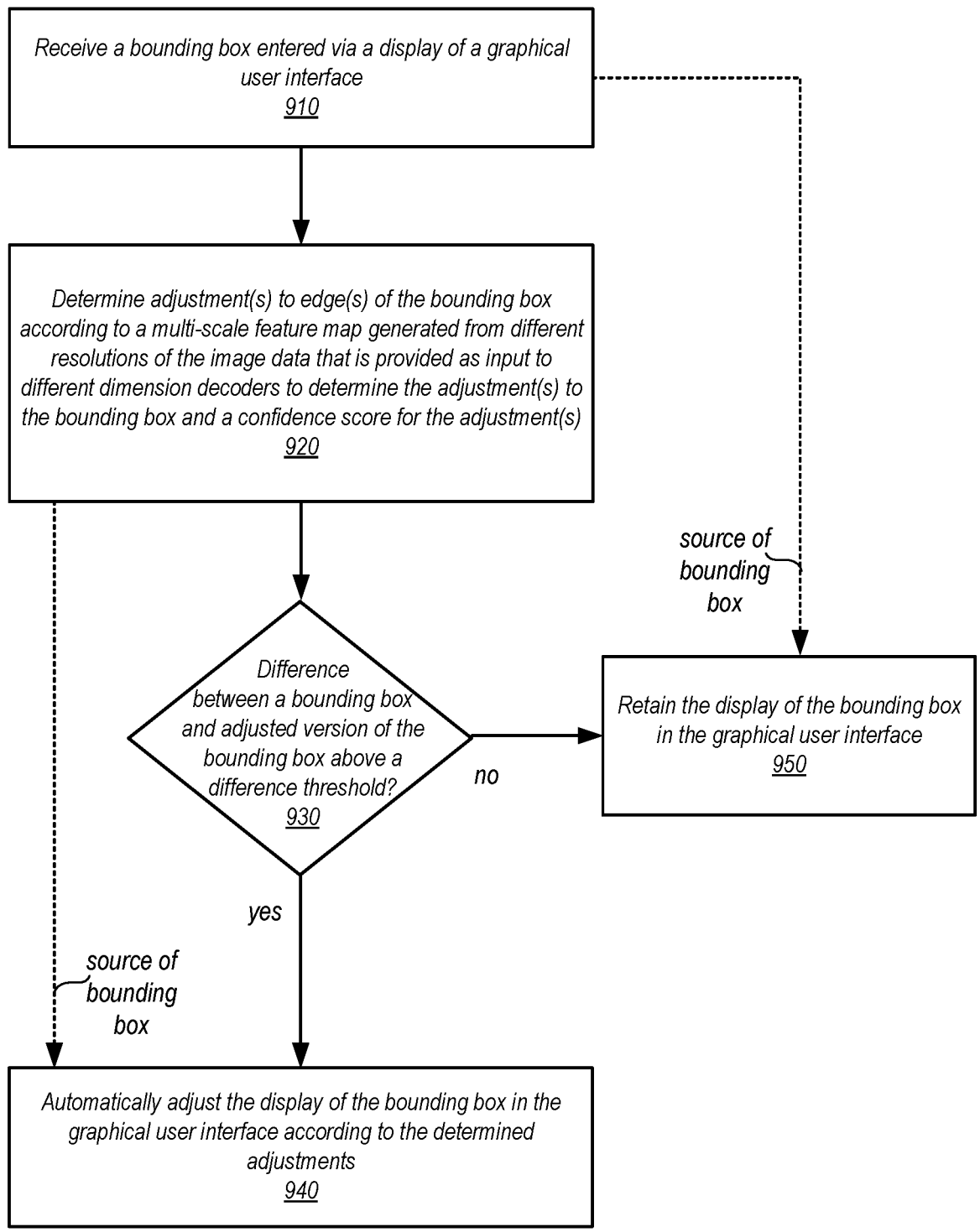
FIG. 9 illustrates a high-level flowchart of various methods and techniques to implement interactive bounding box adjustments according to differences between an obtained and adjusted bounding box, according to some embodiments.

In some scenarios, the provided bounding shape by a user may be of sufficient quality as to justify not making changes in the display. FIG. 9 illustrates a high-level flowchart of various methods and techniques to implement interactive bounding box adjustments according to differences between an obtained and adjusted bounding box, according to some embodiments. As indicated at 910, a bounding box may be received via a display of graphical user interface, in some embodiments. For example, as discussed above with regard to FIG. 4A, a draw or other selection operation may be performed in a display of image data in order to select or otherwise place the bounding box on a portion of the image data.

As indicated at 920, adjustment(s) to one or more edges of the bounding box according may be determined according to a multi-scale feature map generated from different resolutions of the image data that is provided as input to different dimension decoders to determine the adjustment(s) to the bounding box and respective confidence score(s) for the adjustment(s), in some embodiments. FIGS. 5 and 6, discussed above, may describe the various techniques for determining these adjustments.

As indicated at 930, the difference between a bounding box and an adjusted version of the bounding box according to the determined adjustments be compared with a difference threshold. Although not illustrated, in some embodiments, adjustments with confidence scores below a confidence score threshold may not be included in the difference analysis (e.g., the originally obtained edge may be used instead). For example, the difference threshold may be set in such a way as to determine when automated changes affect a meaningful improvement in bounding box quality. As indicated at 940, the display of the bounding box in the graphical user interface may be automatically adjusted according to the determined adjustments, if above the difference threshold. In this way, a user that provides a high quality bounding box definition is not overridden by a labeling system, like labeling system 100 discussed above. For instance, as indicated at 950, the display of the bounding box is retained if the difference is not above the difference threshold. Although the techniques are discussed above in the context of utilizing a bounding box, similar techniques and advantage may be obtained for other bounding shapes in other embodiments.

The methods described herein may in various embodiments be implemented by any combination of hardware and software. For example, in one embodiment, the methods may be implemented on or across one or more computer systems (e.g., a computer system as in FIG. 10) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 10:
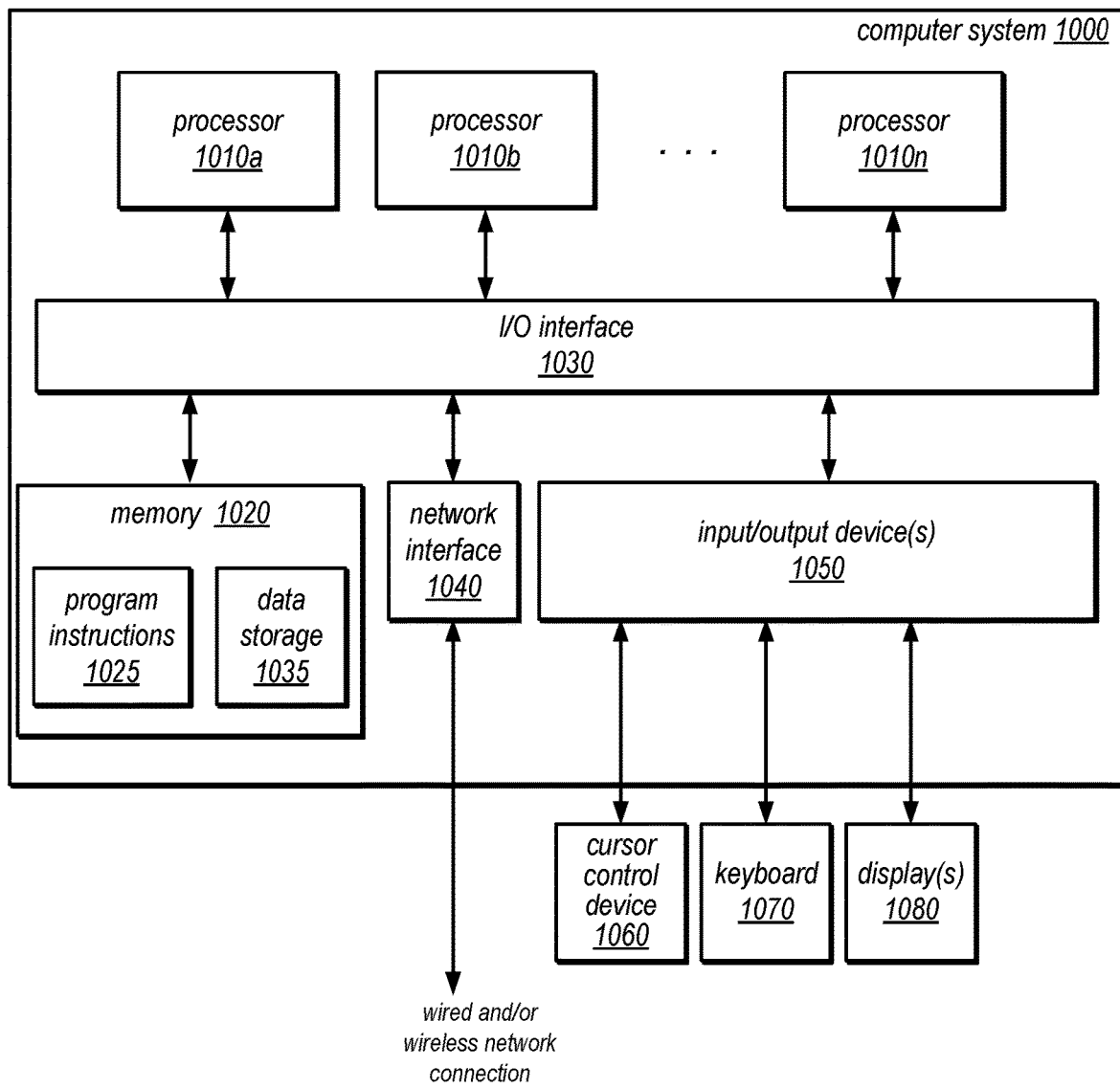
FIG. 10 illustrates an example system to implement the various methods, techniques, and systems described herein, according to some embodiments.

Embodiments of adjustments to bounding shapes for detected objects in image data as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, that implement the various methods and techniques as described herein, including the application of a pose-based personal equipment detection model to detect and determine proper placement of personal equipment in image data, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, causes the at least one processor to:
   receive a bounding box for an object detected in image data;
   independently determine one or more adjustments to one or more edges of the bounding box according to a multi-scale feature map generated from different resolutions of the image data that is provided as input to different dimension decoders to determine the one or more adjustments to the bounding box and generate respective confidence scores for the one or more adjustments to the bounding box; and
   determine that the confidence scores for the one or more adjustments to the one or more edges of the bounding box satisfies a confidence threshold; and
   display an updated version of the bounding box according to the one or more adjustments to the one or more edges of the bounding box after the determination that the confidence scores for the one or more adjustments to the one or more edges of the bounding box satisfy the confidence threshold.

2. The system of claim 1, wherein the memory stores further program instructions that when executed further cause the at least one processor to:
   determine that a difference between the bounding box and a version of the bounding described by the one or more adjustments is above a difference threshold; and
   wherein the display of the updated version of the bounding box according to the one or more adjustments to the one or more edges of the bounding box is performed after the determination that the difference between the bounding box and the version of the bounding box described by the one or more adjustments is above the difference threshold.

3. The system of claim 1, wherein the bounding box is received as draw operation via a graphical user interface, and wherein the display of the updated version of the bounding box according to the one or more adjustments to the one or more edges of the bounding box automatically updates the drawn bounding box in the graphical user interface.

4. The system of claim 1, wherein the at least one processor and the memory is implemented as part of a machine learning service offered by a provider network that displays the updated version of the bounding box via a labeling interface for the machine learning service.

5. A method, comprising:
obtaining, at an image labeling system, a bounding shape for an object detected in image data;
independently determining, by the image labeling system, one or more adjustments to one or more edges of the bounding shape according to a multi-scale feature map generated from different resolutions of the image data that is provided as input to different dimension decoders to determine the one or more adjustments to the one or more edges of the bounding shape and generate respective confidence scores for the one or more adjustments to the bounding shape; and
after determining that the respective confidence scores for the one or more adjustments to the one or more edges of the bounding shape satisfy a confidence threshold, providing, by the image labeling system, the one or more adjustments to the one or more edges of the bounding shape.

6. The method of claim 5, further comprising:
determining that a difference between the bounding shape and a version of the bounding shape described by the one or more adjustments is above a difference threshold; and
wherein the providing of the one or more adjustments to the one or more edges of the bounding shape is performed after the determination that the difference between the bounding box and the version of the bounding shape described by the one or more adjustments is above the difference threshold.

7. The method of claim 6, wherein the bounding shape for the object detected in image data is obtained via a validation interface.

8. The method of claim 5, wherein the bounding shape is obtained as draw operation via a graphical user interface of the image labeling system, and wherein providing the one or more adjustments to the one or more edges of the bounding shape comprises automatically updating the drawn bounding shape in the graphical user interface with an updated version of the bounding shape according to the one or more adjustments to the one or more edges of the bounding shape.

9. The method of claim 5, wherein another adjustment determined for another edge of the bounding shape different from the one or more edges is not provided after a determination that a confidence score for the other edge does not satisfy the confidence threshold.

10. The method of claim 5, wherein independently determining the one or more adjustments to the one or more edges of the second bounding shape comprises:
cropping the image data, including the bounding shape for the detected object in the cropped image data;
applying a convolutional neural network (CNN) machine learning model to extract features of the cropped image data at the different resolutions;
combining the extracted features at the different resolutions to generate the multi-scale feature map;
applying vertical pooling and a one dimensional decoder to the multi-scale feature map to generate new left and right edges for the bounding shape;
applying horizontal pooling and another one dimensional decoder to the multi-scale feature map to generate new top and bottom edges for the bounding shape; and
wherein the new left and right edges and the new top and bottom edges are the one or more adjustments to the bounding shape.

11. The method of claim 5, wherein the bounding shape is a polygon.

12. The method of claim 5, wherein providing the one or more adjustments to the one or more edges of the bounding shape comprises displaying an updated version of the bounding shape determined according to the one or more adjustments to the one or more edges.

13. The method of claim 5, wherein providing the one or more adjustments to the one or more edges of the bounding shape comprises storing the one or more adjustments to the one or more edges as a new version of the bounding shape as part of a training data set.

14. One or more non-transitory, computer-readable storage media, storing program instructions that when executed on or across one or more computing devices cause the one or more computing devices to implement:
obtaining a bounding shape for an object detected in image data;
independently determining one or more adjustments to one or more edges of the bounding shape according to a multi-scale feature map generated from different resolutions of the image data that is provided as input to different dimension decoders to determine the one or more adjustments to the bounding shape and generate respective confidence scores for the one or more adjustments to the bounding shape; and
determining that respective confidence scores for the one or more adjustments to the one or more edges of the bounding shape satisfies a confidence threshold; and
displaying the one or more adjustments to the one or more edges of the bounding shape after determining that the confidence scores for the one or more adjustments to the one or more edges of the bounding shape satisfy the confidence threshold.

15. The one or more non-transitory, computer-readable storage media of claim 14, storing further instructions that when executed on or across the one or more computing devices, cause the one or more computing devices to further implement:
determining that a difference between the bounding shape and a version of the bounding shape described by the one or more adjustments is above a difference threshold; and
wherein the displaying the one or more adjustments to the one or more edges of the bounding shape is performed after the determination that the difference between the bounding shape and the version of the bounding shape described by the one or more adjustments is above the difference threshold.

16. The one or more non-transitory, computer-readable storage media of claim 14, wherein the bounding shape is a bounding box rotated such that it is not perpendicular to axes of the image data.

17. The one or more non-transitory, computer-readable storage media of claim 14, wherein the bounding shape is obtained as draw operation via a graphical user interface of the image labeling system, and wherein, in displaying the one or more adjustments to the different edges of the bounding shape, the programming instructions cause the one or more computing devices to implement automatically updating the drawn bounding shape in the graphical user interface with an updated version of the bounding shape according to the one or more adjustments to the one or more edges of the bounding shape.

18. The one or more non-transitory, computer-readable storage media of claim 14, storing further instructions that when executed on or across the one or more computing devices, cause the one or more computing devices to further implement:
   obtaining a second bounding shape for a second object detected in second image data;
   independently determining one or more adjustments to one or more edges of the second bounding shape according to a second multi-scale feature map generated from different resolutions of the second image data that is provided as input to the different dimension decoders to determine the one or more adjustments to the second bounding shape and generate respective second confidence scores for the one or more adjustments to the second bounding shape; and
   determining that a difference between the bounding shape and an adjusted version of the bounding shape determined from the one or more adjustments to the one or more edges of the bounding shape is below a difference threshold; and
   not displaying the one or more adjustments to the one or more edges of the second bounding shape after determining that the difference between the bounding shape and an adjusted version of the bounding shape determined from the one or more adjustments to the one or more edges of the bounding shape is below the difference threshold.

19. The one or more non-transitory, computer-readable storage media of claim 14, wherein, in independently determining the one or more adjustments to the one or more edges of the second bounding shape, the programming instructions cause the one or more computing devices to implement:
   cropping the image data, including the bounding shape for the detected object in the cropped image data;
   applying a convolutional neural network (CNN) machine learning model to extract features of the cropped image data at the different resolutions;
   combining the extracted features at the different resolutions to generate the multi-scale feature map;
   applying vertical pooling and a one dimensional decoder to the multi-scale feature map to generate new left and right edges for the bounding shape;
   applying horizontal pooling and another one dimensional decoder to the multi-scale feature map to generate new top and bottom edges for the bounding shape; and
   wherein the new left and right edges and the new top and bottom edges are the one or more adjustments to the bounding shape.

20. The one or more non-transitory, computer-readable storage media of claim 14, wherein the one or more computing devices are implemented as part of a machine learning service offered by a provider network that displays the one or more adjustments to the bounding shape via a labeling interface for the machine learning service.

* * * * *